United States Patent [19]
Hemström et al.

[11] Patent Number: 5,534,144
[45] Date of Patent: Jul. 9, 1996

[54] TUBULAR FILTER ARRANGEMENT WITH LIQUID DISTRIBUTING CASING

[75] Inventors: Bengt Hemström, Älvkarleby; Johan Persson, Gävle; Rolf Karlsson, Älvkarleby, all of Sweden

[73] Assignee: Vattenfall Utveckling AB, Alvkarleby, Sweden

[21] Appl. No.: 347,355

[22] PCT Filed: Jun. 1, 1993

[86] PCT No.: PCT/SE93/00483
§ 371 Date: Dec. 1, 1994
§ 102(e) Date: Dec. 1, 1994

[87] PCT Pub. No.: WO93/24217
PCT Pub. Date: Dec. 9, 1993

[30] Foreign Application Priority Data

Jun. 2, 1992 [SE] Sweden ................ 9201705

[51] Int. Cl.$^6$ ............ B01D 37/02; B01D 29/90
[52] U.S. Cl. ............ 210/193; 210/291; 210/323.2; 210/456
[58] Field of Search ............ 210/263, 291, 210/323.2, 321.88, 321.89, 321.9, 456, 497.01, 193; 55/434

[56] References Cited

U.S. PATENT DOCUMENTS 4,283,282  8/1981  Saint-Dizier et al. ........... 210/323.2
5,128,038  7/1992  Slavitschek et al. ........... 210/456

FOREIGN PATENT DOCUMENTS

3810696A1  10/1988  Germany.
8902453    1/1991   Sweden.
621947     3/1981   Switzerland.

*Primary Examiner*—Joseph W. Drodge
*Attorney, Agent, or Firm*—Scully, Scott, Murphy & Presser

[57] ABSTRACT

A unit for treating liquid comprises a cylindrical container (1) which, in an upper chamber (6), has a set of slender tubes (8) which the liquid is forced to pass on its way from an inlet (10) to an outlet (9), so as to be subjected to a treatment, such as deionization, during this forced passage. An annular casing (11) is arranged in a lower chamber (7) and serves to distribute the liquid flowing in through the inlet (10). The casing (11) is defined by inner and outer side walls (12, 13) sealingly interconnected along an upper edge portion (14) as well as interconnected by at least one lower, transverse wall (15) which is provided with a plurality of small holes through which the liquid is squeezed out in the form of a large number of individual jets. The cross-sectional area of the liquid-distributing casing (11) continuously decreases away from the inlet (10) towards an opposite end (18) of the casing. A centrally located means (9) is arranged in the free chamber (7) of the container for deflecting and guiding the liquid flowing inwards from the annular casing (11), in a controlled and even, upwardly-directed flow.

17 Claims, 2 Drawing Sheets

TUBULAR FILTER ARRANGEMENT WITH LIQUID DISTRIBUTING CASING

FIELD OF THE INVENTION

This invention relates to a unit for treating liquid, comprising a suitably cylindrical container which, in a first, suitably upper chamber, has a set of comparatively slender tubes or ducts which the liquid is forced to pass on its way from an inlet in the container to an outlet, so as to be subjected to a treatment, such as deionisation, during this forced passage.

BACKGROUND OF THE INVENTION

Units of this type are used in the nuclear industry for cleaning the water to be taken into the reactor, more precisely by deionisation, primarily in respect of Fe ions but also by removal of undesirable pollutants. To this end, the slender treatment tubes are provided with perforations and surrounded by a cloth whose outside is coated with an ion-exchange medium. In actual practice, the treatment tubes are so mounted in an upper chamber as to be separate from an open, lower chamber, the treatment tubes being closed at the bottom and open at the top. Thus, water entering the tubes from outside will first penetrate the external layer of ion-exchange medium and then pass through the small perforations in the circumferential walls of the tubes, before discharging into the upper part of the container, where it is collected in a throughgoing outlet tube extending centrally through the lower, free chamber and out through the bottom of the container.

In prior-art units of this type, the inlet consists of a tube which opens directly into the lower chamber of the container, more precisely in the cylindrical wall, with the tube projecting radially therefrom. One problem which is difficult to master in these known units is that the flow velocity of the water becomes extremely uneven outside the separate treatment tubes owing to uncontrolled turbulence in the lower chamber. Thus, the velocity of the water flowing past the treatment tubes can be extremely high at some tubes while being comparatively low at others. Where the water passes at a high speed, the ion-exchange medium on the tubes is quickly eroded, which shortens the time of operation elapsing between the required restorations of the medium. These restorations being troublesome and time-consuming operations, the too short times of operation therebetween will detract from cost-effectiveness.

SUMMARY OF THE INVENTION

This invention aims at remedying the above-mentioned shortcomings of prior-art units of this type and providing a unit which is capable of long-term operation without there being any need of restoring or replacing the ion-exchange medium. Thus, a basic object of the invention is to provide a unit in which the water flow outside the treatment tubes is even, there being but small variations between the highest and lowest velocity of the flow in the entire set of tubes. Another object of the invention is not only to ensure an even flow of liquid via the treatment tubes in new units, but also to enable modifications of existing units to this very end by using comparatively simple means.

Accordingly, the present invention provides a unit operable for treating a liquid, including a container having an inlet and an outlet and having an upper chamber with a plurality of tubes or ducts, having a liquid treatment medium associated therewith, through which the liquid is forced to pass en route from the inlet of the container to the outlet. A lower chamber includes a liquid-distributing annular casing, with the casing having inner and outer sidewalls sealingly interconnected along an edge portion therein and interconnected by at least one transverse wall. The at least one transverse wall is opposite to the edge portion and includes a plurality of apertures, operable for directing the liquid in the form of a large number of separate jets. A cross-sectional area of the liquid-distributing casing continuously decreases from one end close to the inlet towards an opposite end. A deflection means is substantially centrally located in the second chamber for deflecting and guiding liquid flowing inwardly from the liquid-distributing casing in a controlled and even flow directed towards the set of tubes or ducts for treating the liquid.

DESCRIPTION OF A PREFERRED EMBODIMENT

Figure 1:
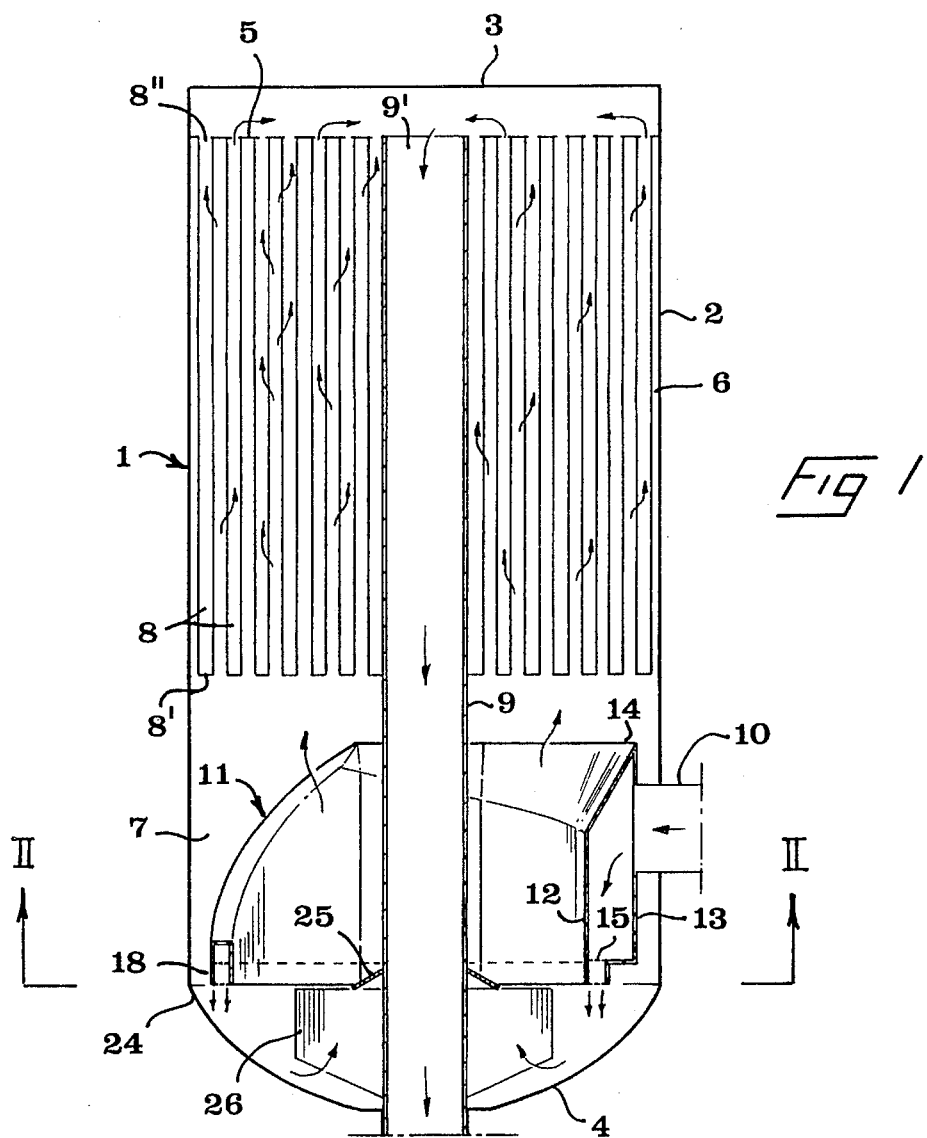
FIG. 1 is a vertical section of a unit according to the invention.

In FIG. 1, the reference sign 1 generally designates a container which is defined by a suitably cylindrical circumferential wall 2, here vertically arranged, an upper end wall 3, and a lower end wall or bottom 4. In the embodiment shown, the bottom wall 4 is convex or dome-shaped, its convexity being directed downwards. The interior of the container 1 is divided into an upper part or chamber 6 and a lower part 7 in the form of a substantially free or open chamber. In the upper chamber 6, there are mounted a plurality of comparatively slender or narrow tubes 8 whose upper ends 8' are open and whose lower ends 8" are closed, as mentioned in the foregoing. The upper tube ends 8' open into a partition 5 located on a level below the upper end wall 3. In practice, the circumferential walls of the tubes 8 are provided with a large number of small perforations (not shown), through which the water can pass from the outside and in. To the outside of each tube has been applied a cloth, itself provided with an ion-exchange medium. Water that has passed through the tubes via the external ion-exchange medium collects in the space below the upper end wall 3, to leave through a central, comparatively wide outlet tube 9 extending through the entire container from the upper opening 9' and out through the bottom wall 4. The container has an inlet tube 10 for untreated water, which is connected to the cylindrical circumferential wall 2 of the container, whence it projects radially. In actual practice, the container may have a diameter of 1–3 m, suitably about 1.5 m, and an axial height of 3–6 m, the upper chamber 6 occupying 50% or more of the total container volume.

In the embodiment shown in FIG. 1, the slender treatment tubes 8 are mounted in the upper part of the container, the free chamber 2 being located in the lower part of the container. For this reason, the chamber 6 is here simply referred to as the upper chamber, while the chamber 7 is referred to as the lower chamber. It should, however, be emphasised that the reverse arrangement is by no means excluded, i.e. the treatment tubes 8 may be mounted in the lower part of the container while the free chamber is located in the upper part. For this reason, the chambers 6 and 7 are in the appended claims referred to as, respectively, the first and the second chamber.

As described thus far, the illustrated unit or assembly is in substance previously known.

Figure 2:
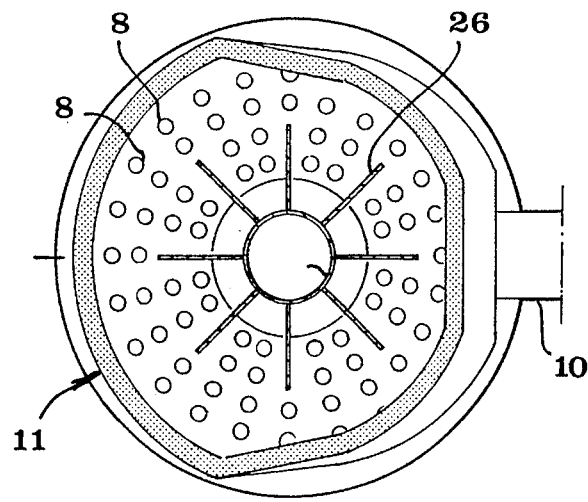
FIG. 2 is a horizontal section taken along the line II—II in FIG. 1.
Figure 3:
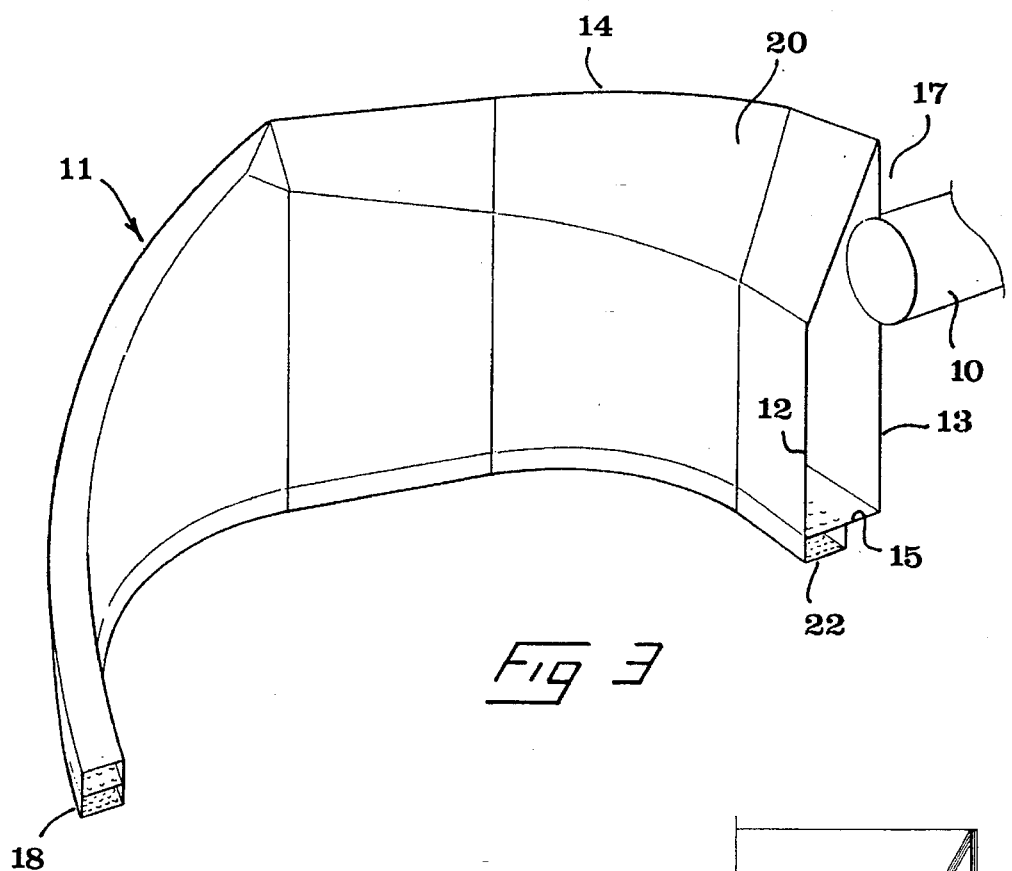
FIG. 3 is an enlarged cut-away perspective view of one half of a liquid-distributing casing forming part of the unit according to the invention.
Figure 5:
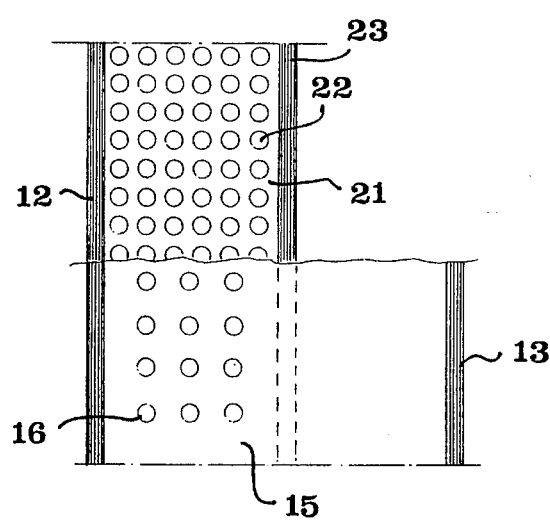
FIG. 5 is a still further enlarged top plan view of a portion of the casing bottom.

According to the invention, an annular casing or shell, generally designated 11, is arranged in the free chamber 7 (here the lower chamber) and serves to distribute the water flowing into the container through the inlet 10. As appears from FIG. 1 combined with the other Figures, the liquid-distributing casing 11 is defined by inner and outer side walls 12 and 13, respectively, which are sealingly interconnected along an upper edge portion 14 as well as interconnected by at least one transverse wall 15 provided with a plurality of small holes or openings 16 through which the water can be forced out in the form of a large number of individual jets. In practice, the casing 11 is in the form of a closed annulus (see FIG. 2). FIG. 3 shows one half of the annulus, a first end of this half located close to the inlet 10 being designated 17, while the opposite end is designated 18. According to a characteristic of the invention, the cross-sectional area of the liquid-distributing casing decreases continuously from the inlet end 17 towards the opposite end 18. Conveniently, the decrease of the cross-sectional or flow area of the liquid-distributing casing is substantially linear from the inlet end 17 towards the diametrically opposite end 18.

Theoretically, the two walls 12, 13 defining the internal cavity 19 of the liquid-distributing casing might ideally consist of suitably shaped, single metal plates. In actual practice, however, such an arrangement is not easily compatible with manufacturing technique, and the illustrated embodiment is therefore composed of a number of separate metal-sheet sections which have been welded together to form a casing of approximately ideal shape. As appears from FIGS. 3 and 4, the outer sheet-metal wall 13 is substantially vertical in its extent between the upper edge portion 14 and the bottom wall 15, while the inner wall 12, at least in the area of the inlet end 17, terminates on a level below the upper edge portion 14 to be connected to the outer wall by inclined sheet-metal portions or sections 20 which here impart to the casing an upwardly tapering cross-sectional shape. As is evident from FIG. 3, the reduction of the cross-sectional area of the casing from the end 17 towards the end 18 is at least partly due to a gradual decrease in height of the casing. In practice, the reduction of the cross-sectional area of the casing from the inlet end 17 towards the opposite end 18 is also due to the bottom wall 15 gradually tapering, at least partly, from the inlet end towards the opposite end (see also FIG. 2). The purpose of designing the cover such that its cross-section decreases linearly from the inlet end towards the opposite end is to make the flow velocity as even as possible along its path, and thereby obtain the same outflow coefficient and the same outflow at all the holes 16 in the transverse bottom wall 15. Conveniently, the bottom wall 15 is made of comparatively thick sheet metal, the holes 16 having a comparatively small diameter. Thus, the metal sheet 15 should have a thickness of 8–15 mm or 9–12 mm, while the diameter of the holes 16 should not exceed the thickness of the metal sheet. When the metal sheet is 10 mm thick, the holes may have a diameter of 10 mm. In the illustrated and tested embodiment, the total area of the holes 16 is approximately $0.045 \text{ m}^2$, there being about 570 holes having a diameter of 10 mm. At a flow of 200 kg/s, the flow rate through the holes is 4.4 m/s and the pressure drop is slightly more than 1 mvp. This pressure drop over the flow-resistance-creating barrier formed by the apertured wall 15 is at least twice as large, conveniently at least five times as large, as the velocity height of the average flow in the annular casing. In the area of the inlet 10, the flow rate of the water streaming in the cover is approximately 0.87 m/s (0.038 mvp). The high velocity of the jets passing through the holes gives an even distribution of the outflow along the annular casing (which has been verified in tests by the fact that practically all the liquid jets were of approximately the same height when sprayed out through the holes in a casing turned upside down).

However, the high velocity of the liquid jets which is aimed at in view of an even distribution of the water along the annular casing would in itself have an adverse effect on the flow pattern in the free lower chamber 7. To eliminate or counteract this adverse effect, means for reducing the velocity of the liquid jets are provided in the area below the apertured transverse wall 15. Here, these means consist of a second transverse wall 21 arranged at a distance from the first-mentioned transverse wall 15 and also being provided with a plurality of small holes 22. The total area of the holes 22 is larger, suitably 2–4 times larger, than the total area of the holes in the first transverse wall 15 (here approximately $0.140 \text{ m}^2$). Thus, the second, lower wall 21 will reduce the velocity of the liquid jets without creating any marked flow-through resistance.

Figure 4:
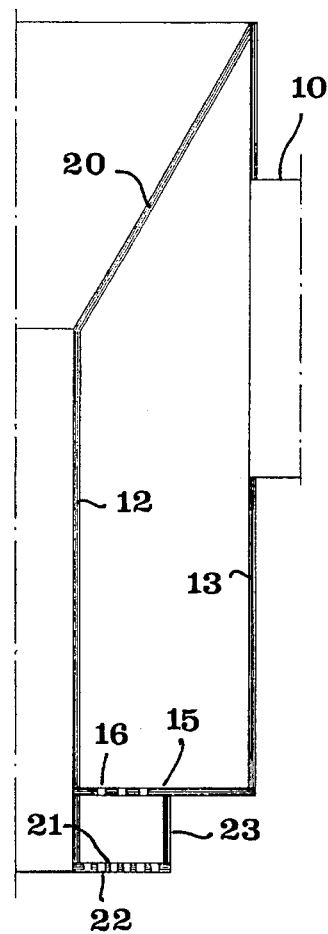
FIG. 4 is a further enlarged vertical cross-section of a portion of the casing in FIG. 3.

In FIG. 4, the lower transverse wall 21 is connected to the casing by the lower portion of the inner wall 12 as well as by a separate marginal metal sheet 23 located inwardly of the outer wall 13. The marginal metal sheet 23 is, however, only to be found in the comparatively broad area of the casing associated with the inlet. The width of the casing decreases gradually and, at a point between the two ends 17 and 18, the marginal metal sheet 23 merges into an extension piece of the outer wall 13.

As appears from FIG. 1, the liquid-distributing casing 11 is so positioned that the array of holes 22 in the lower transverse wall 21 open in the immediate vicinity of the transition area 24 between the circumferential wall 2 and the bottom wall 4 of the container. To be more specific, the lower transverse wall 21 is located in a plane substantially horizontal or perpendicular with respect to the centre axis of the container. As a result of this arrangement, the water flowing out into the lower chamber 7 of the container will impinge upon the dome-shaped bottom wall 4 of the container and flow along this wall inwards towards the centre. At the centre, there is provided the tube 9 which serves not only as an outlet for the treated water but also as a guide means for deflecting and guiding the liquid flowing inwards from the liquid-distributing casing 11, in a controlled upwardly-directed flow. For this reason, the tube 9 should have a comparatively large diameter in order to provide a substantial impact surface for the water. A circumferential collar 25 remote from the bottom wall 4 is arranged on the outside of the tube 9 and serves to deflect the water flowing upwards along the tube and guide it away from the tube towards more peripheral areas of the lower free chamber of the container. Between the collar 25 and the bottom wall 4 of the container, there are further provided a number of vertical vanes 26 projecting substantially radially from the tube and adapted to counteract laterally-directed redistribution of the flow of water in the area between the collar and the bottom wall. In the embodiment shown, there are eight vanes, but this number may, of course, vary both upwards and downwards. The water flowing in towards the central tube 9 in the bottom area of the chamber 7 will be intercepted by the separate inwardly-tapering compartments defined between the vanes, and will then flow upwards along the tube in a number of vertical partial flows which, when they impinge upon the collar 25, are deflected outwards from the tube to be, in the upper part of the chamber 7, spread substantially uniformly over the entire cross-section of the container 1, thus ensuring an even and uniform flow of water via all the treatment tubes 8 in the upper part of the container.

The advantages of the invention are evident. The liquid-distributing casing described ensures an even flow of water on the outside of the treatment tubes 8 provided with ion-exchange medium, thereby avoiding that the instantaneous flow velocity at separate tubes exceeds that speed (in practice about 0.4 m/s) at which the ion-exchange medium is eroded. Thus, the lifespan of the ion-exchange medium is substantially increased, allowing considerable times of operation between the shutdowns needed for overhaul and restoration.

Conceivable Modifications of the Invention

It goes without saying that the invention is by no means restricted to the embodiment described above and shown in the drawings. Thus, the invention can be used also for treating other liquids than water. Neither is it restricted to such treatment as deionisation or cleaning. The main point is that the separate slender treatment tubes in a set require an even flow of liquid having controlled velocity. In the embodiment shown, the annular liquid-distributing casing 11 is composed of two substantially identical, albeit reversed, halves extending from the inlet, where the cross-sectional area of each half is at its largest, to a diametrically opposite end, where the cross-sectional area goes towards zero. It is, however, conceivable, although not preferred, to design the annular casing as a coherent unit extending substantially 360° from a thick inlet end to an opposite closed end near the inlet tube. In the embodiment illustrated, the liquid-distributing casing is a separate unit which can be mounted also in existing unit containers, apart from being mountable in new units. However, the liquid-distributing casing may be a unit integrally formed with the container, preferably when being manufactured. If so, parts of the circumferential wall 2 of the container, such as a wall replacing the outer wall 13 shown, are used for defining the interior of the casing. Such a design has the advantage of the liquid-discharging holes 16, 22 of the casing being located as far out towards the periphery of the container as possible, which is desirable also in the illustrated insert-type liquid-distributing casing. Although the central outlet tube 9 in the embodiment shown has the advantage of also serving as a guide means for upwardly deflecting the inwardly-directed flows of liquid, other guide means may also be used. Thus, the outlet tube can be arranged in the upper part of the container and be replaced with a special column centrally located in the lower chamber of the container. As briefly mentioned by way of introduction, the spatial position of the container is not critical. Thus, the treatment tubes 8 may also be located in the lower part of the container, while the free chamber containing the liquid-distributing casing is located in the upper part of the container. Furthermore, the container need not necessarily be vertically arranged, as in FIG. 1. Also, the term annular casing is to be interpreted in its broadest sense, encompassing casings of closed as well as open annular shape. Moreover, the lower apertured metal sheet or wall 21 can be replaced with e.g. a grating or some other optional means able to reduce the velocity of the liquid jets flowing through the holes in the bottom wall 15.

We claim:

1. A unit operable for treating liquid, including a container having an inlet and an outlet and having an upper chamber with a plurality of tubes or ducts, having a liquid treatment medium associated therewith, through which liquid is forced to pass en route from said inlet of said container to said outlet, a lower chamber including a liquid-distributing annular casing, said casing having inner and outer side walls sealingly interconnected along an edge portion therein and interconnected by at least one transverse wall, said at least one transverse wall being opposite to said edge portion and including a plurality of apertures, operable for directing the liquid in the form of a large number of separate jets, a cross-sectional area of the liquid-distributing casing continuously decreasing from one end close to said inlet towards an opposite end of the casing; and means substantially centrally located in said lower chamber for deflecting and guiding liquid flowing inwardly from said liquid-distributing casing in a controlled and even flow directed towards said plurality of tubes or ducts for treating the liquid.

2. A unit as claimed in claim 1, wherein the cross-sectional area of the liquid-distributing casing decreases in a substantially linearly manner.

3. A unit as claimed in claim 2, wherein said liquid-distributing casing comprises two halves in which the cross-sectional areas decrease in a substantially identical manner, and in each half the cross-sectional area decreases at least by way of the height of the casing.

4. A unit as claimed in claim 3, wherein said liquid-distributing casing is disposed with the apertures in the at least one transverse wall opening in the vicinity of a transition area between a side wall and an end or bottom wall of the container.

5. A unit as claimed in claim 4, wherein the container end or bottom wall is a convex or dome-shaped wall, the convexity of which is directed away from said upper chamber.

6. A unit as claimed in claim 4, wherein said at least one transverse wall of the liquid-distributing casing is located in a plane substantially perpendicular with respect to the centre axis of the container.

7. A unit as claimed in claim 6, wherein said liquid-distributing casing is a separate component which is mounted in said container, the side wall of which is separated from the container side wall by an annular gap.

8. A unit as claimed in claim 7, wherein the liquid-guiding means is a column extending from said end or bottom wall associated with said lower chamber of said container to said tubes or ducts.

9. A unit as claimed in claim 8, wherein said column is a cylindrical tube.

10. A unit as claimed in claim 9, wherein said cylindrical tube includes a sealed circumferential collar extending from said end or bottom wall for deflecting liquid flowing along the column and guiding said liquid away from the column towards a peripheral area of said lower chamber of the container.

11. A unit as claimed in claim 10 wherein a plurality of vanes projecting substantially radially from said column are arranged between said collar and said end or bottom wall and are adapted to counteract laterally-directed redistribution of liquid flow in the area between the collar and the end or bottom wall.

12. A unit as claimed in claim 1, wherein said unit includes means adjacent said at least one transverse wall for reducing the velocity of the jets passing through the apertures in said at least one transverse wall.

13. A unit as claimed in claim 12 wherein said means for reducing the velocity of said jets comprises an additional transverse wall, said additional transverse wall including a plurality of small holes, the total area of the holes in the additional transverse wall being larger that the total area of said apertures in said at least one transverse wall.

14. A unit as claimed in claim 13, wherein said area of said holes in said additional transverse wall is between about two to four times greater than the total area of said apertures in said at least one transverse wall.

15. A unit as claimed in claim 13, wherein said at least one transverse wall in said liquid-distributing casing each comprise a metal sheet having a thickness of 8–15 mm in which said apertures are substantially cylindrical and perpendicular to the plane of the metal sheet and have a diameter not exceeding the thickness of the metal sheet.

16. A unit as claimed in claim 15, wherein said at least one transverse wall in said liquid-distributing casing each comprise a metal sheet having a thickness of 9–12 mm.

17. A unit as claimed in claim 1, wherein said outer wall of said liquid-distributing casing extends in its entirety substantially vertically from the casing bottom to an upper circumferential edge, and said inner wall at least partly extends from said casing bottom substantially vertically and merges into an inclined wall portion joining said upper edge to form an edge portion of the casing which tapers in a wedge-like manner in both a horizontal and vertical cross-section.

* * * * *

UNITED STATES PATENT AND TRADEMARK OFFICE
CERTIFICATE OF CORRECTION

PATENT NO. : 5,534,144
DATED : July 9, 1996
INVENTOR(S) : Bengt Hemstrom, et al.

It is certified that error appears in the above-indentified patent and that said Letters Patent is hereby corrected as shown below:

Column 7, line 9, Claim 13: "that" should read --than--

Signed and Sealed this

Twenty-fourth Day of June, 1997

Attest:

BRUCE LEHMAN

*Attesting Officer*     *Commissioner of Patents and Trademarks*